Figure 1:
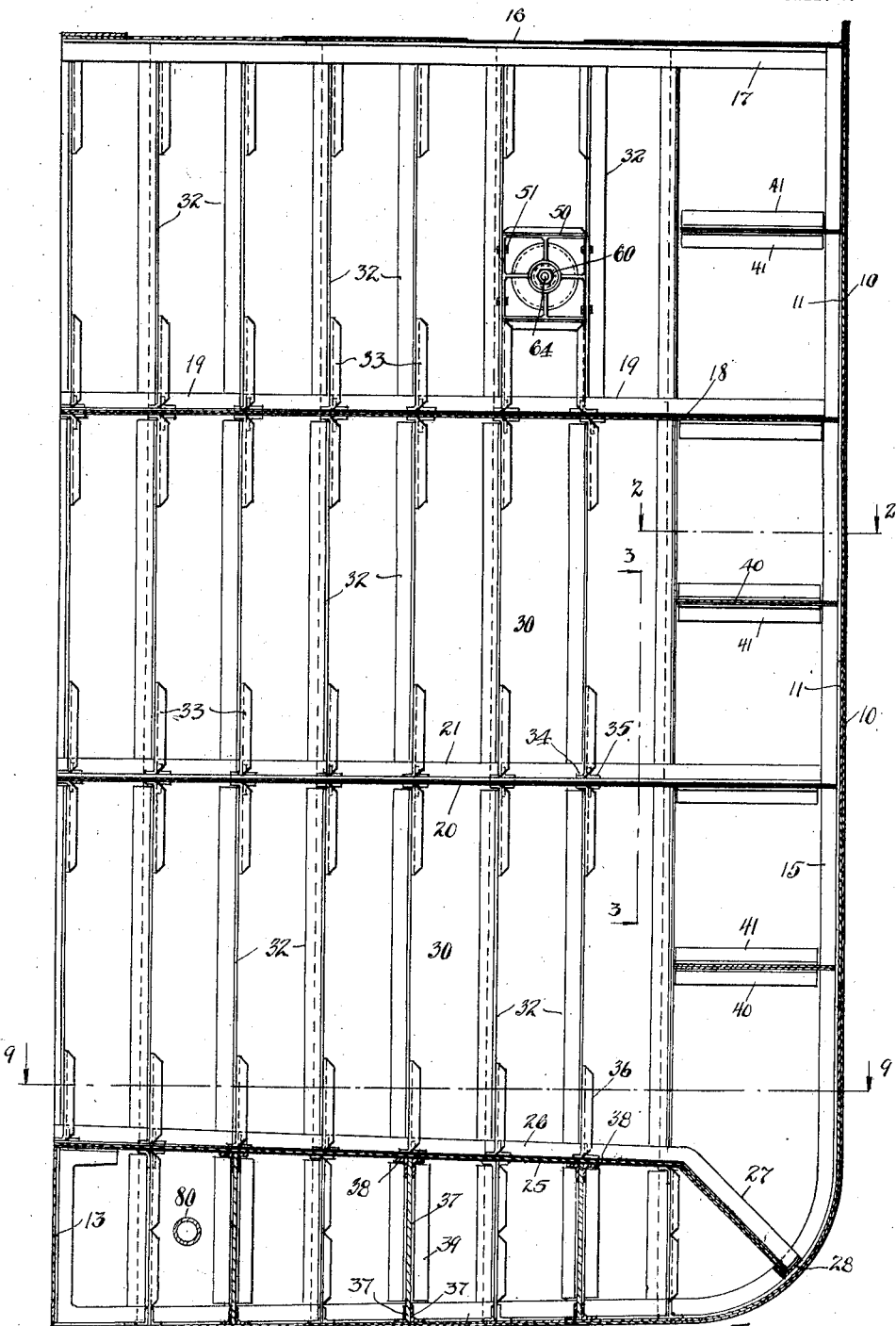

J. NACEY.
SECTIONAL SHIP AND METHOD OF JOINING THE SECTIONS.
APPLICATION FILED DEC. 12, 1918.

1,338,246. Patented Apr. 27, 1920.
5 SHEETS—SHEET 1.

INVENTOR
James Nacey,
By Baker & Macklin, Att'ys.

J. NACEY.
SECTIONAL SHIP AND METHOD OF JOINING THE SECTIONS.
APPLICATION FILED DEC. 12, 1918.
1,338,246.
Patented Apr. 27, 1920.
5 SHEETS—SHEET 2.
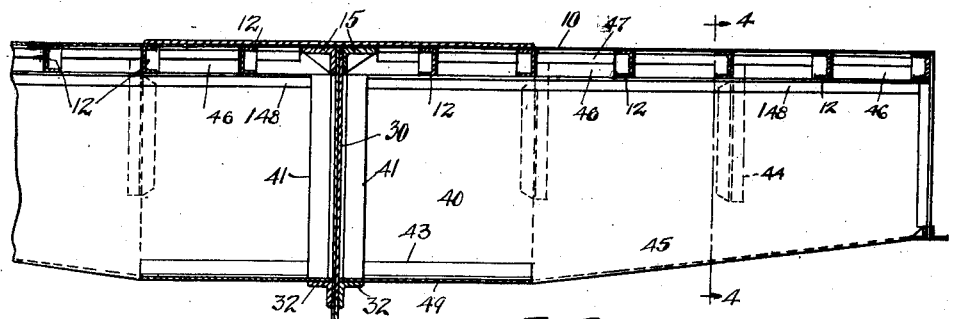
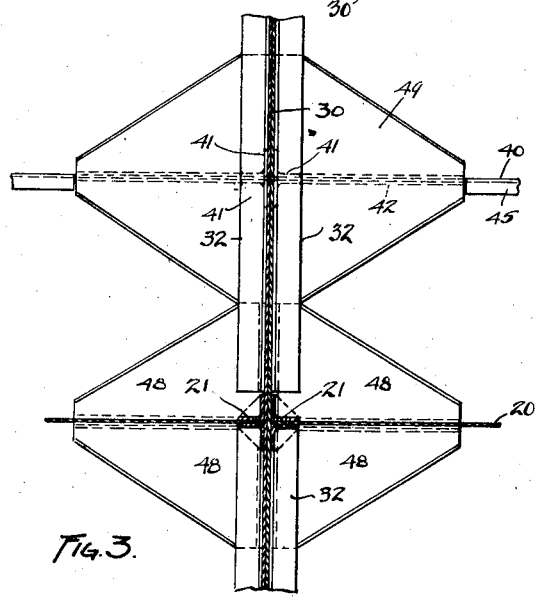
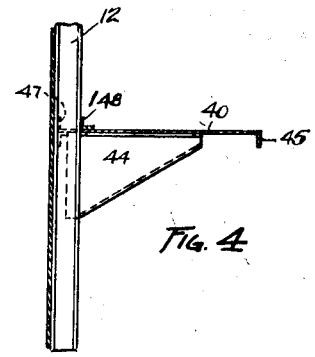
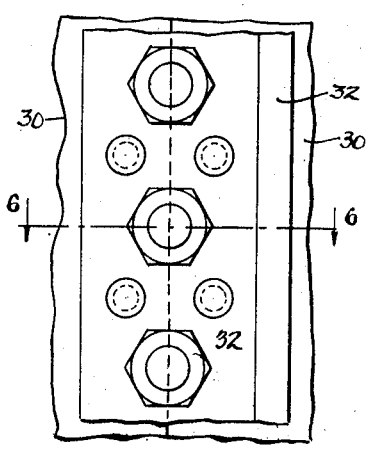
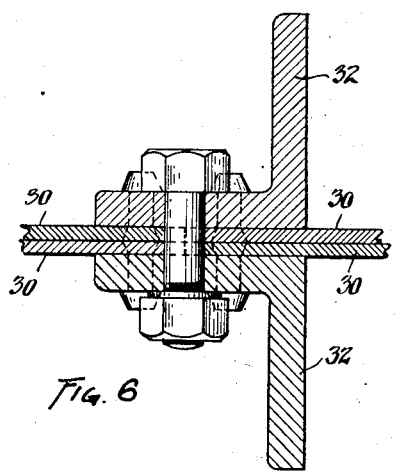
INVENTOR
James Nacey,
BY Baker Macklin,
ATTORNEYS.

J. NACEY.
SECTIONAL SHIP AND METHOD OF JOINING THE SECTIONS.
APPLICATION FILED DEC. 12, 1918.
1,338,246.
Patented Apr. 27, 1920.
5 SHEETS—SHEET 3.
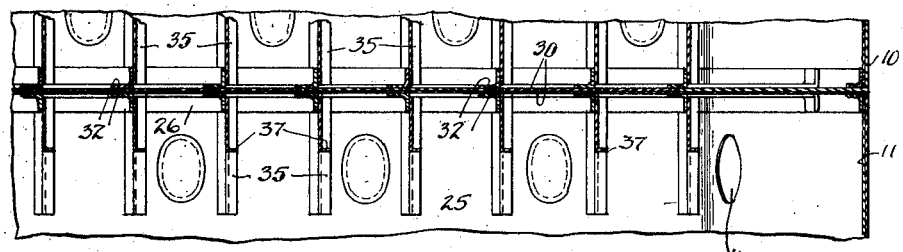
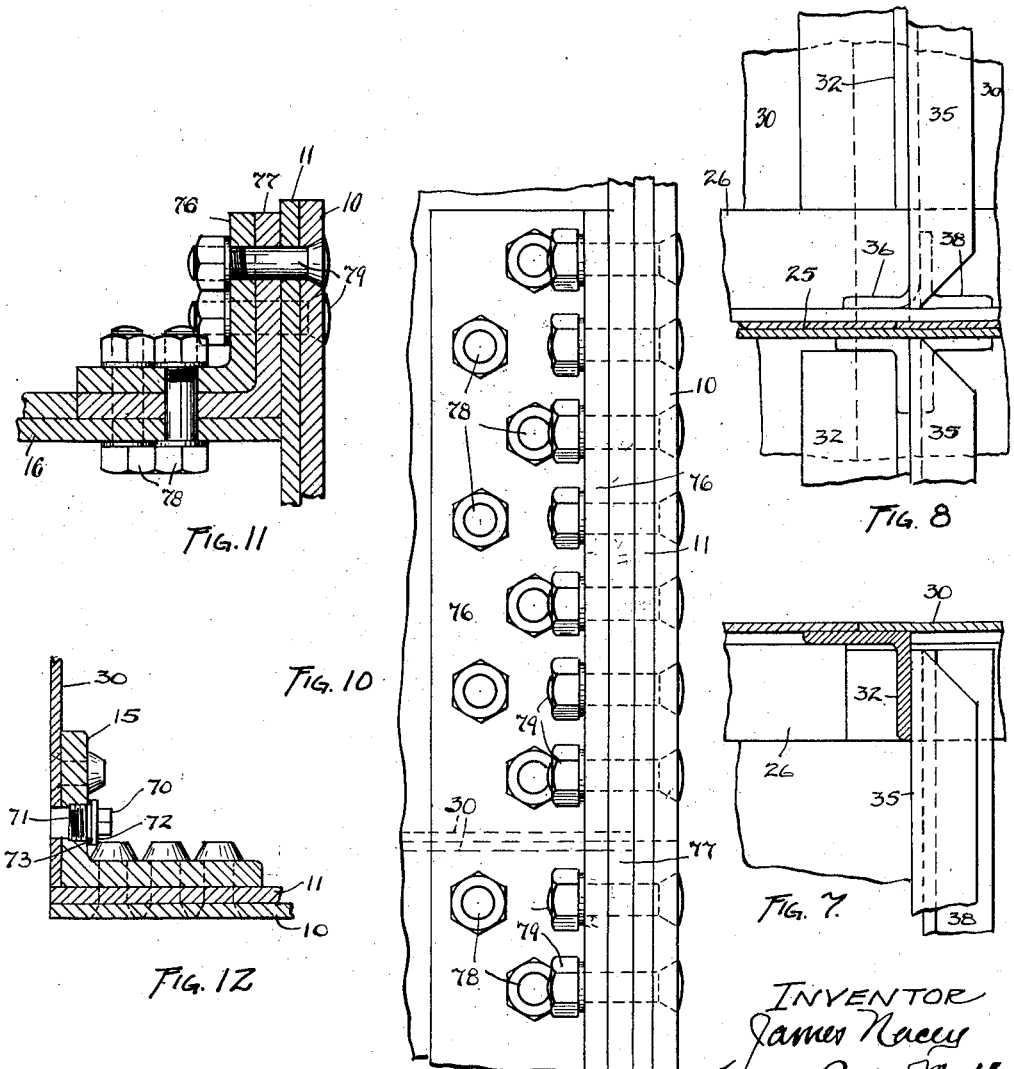

J. NACEY.
SECTIONAL SHIP AND METHOD OF JOINING THE SECTIONS.
APPLICATION FILED DEC. 12, 1918.
1,338,246.
Patented Apr. 27, 1920.
5 SHEETS—SHEET 4.
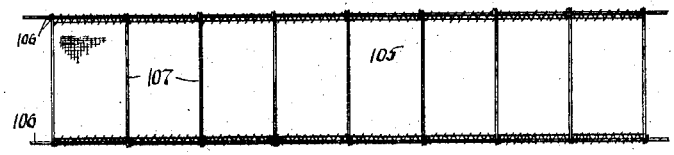
Fig. 13
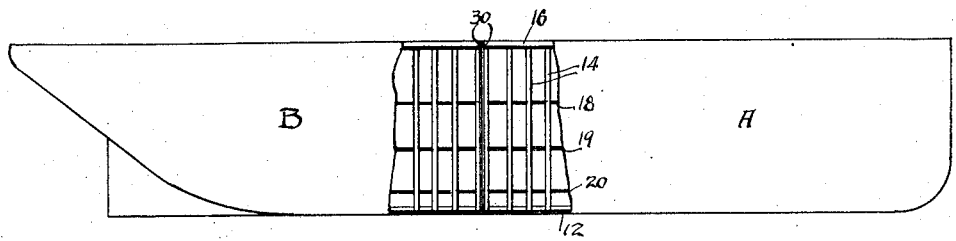
Fig. 14
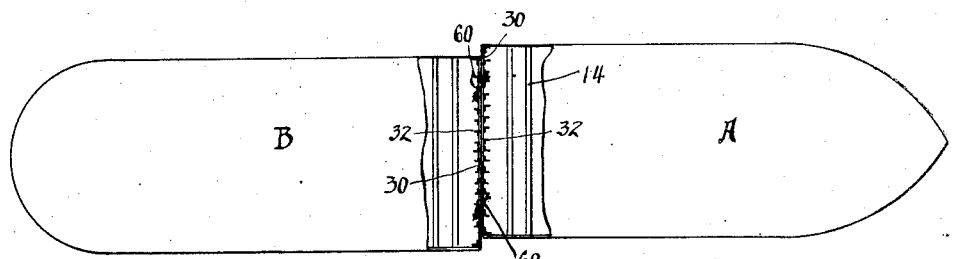
Fig. 15
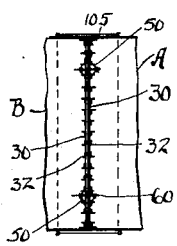
Fig. 16.
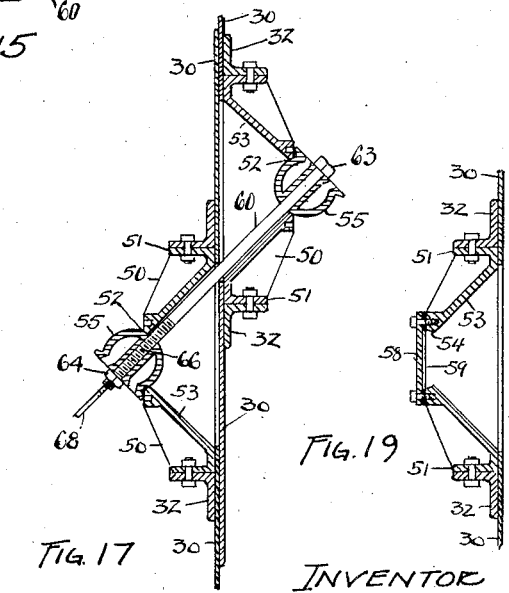
Fig. 19
Fig. 17
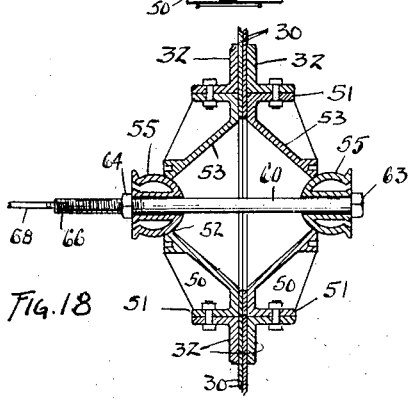
Fig. 18
INVENTOR
James Nacey,
By Baker & Macklin,
ATTORNEYS.

J. NACEY.
SECTIONAL SHIP AND METHOD OF JOINING THE SECTIONS.
APPLICATION FILED DEC. 12, 1918.

1,338,246.

Patented Apr. 27, 1920.

5 SHEETS—SHEET 5.

INVENTOR
James Nacey,
By Baker Macklin,
ATTORNEYS.

UNITED STATES PATENT OFFICE.

JAMES NACEY, OF CLEVELAND, OHIO.

SECTIONAL SHIP AND METHOD OF JOINING THE SECTIONS.

1,338,246.   Specification of Letters Patent.   Patented Apr. 27, 1920.

Application filed December 12, 1918. Serial No. 266,431.

*To all whom it may concern:*

Be it known that I, JAMES NACEY, marine architect, a citizen of the United States, residing at Cleveland, in the county of Cuyahoga and State of Ohio, have invented a certain new and useful Improvement in Sectional Ships and Methods of Joining the Sections, of which the following is a full, clear, and exact description, reference being had to the accompanying drawings.

This invention relates to the construction of ships in sections, enabling the sections to pass independently through canal locks or other restricted passages and be thereafter joined together. The general object of the invention is to provide for the joining of the sections, or effecting their separation, while afloat and without the aid of a dry dock or any such appliance.

More specifically, it is an object of the invention to provide transverse bulk heads forming end closures for the sections, so arranged that they may present smooth exteriors enabling the sections to be directly abutted and secured by rivets or bolts through the bulk heads, these bulk heads being so constructed and braced that they will not only provide an effective end closure when the parts are separated, but will be useful in stiffening and strengthening the vessel when joined. Another object is to provide simple and efficient means for drawing the separate sections together into accurate registration after they have been brought into approximate engagement and such rough registration as may be readily effected while the sections are floating. Another object is to provide simple and efficient means for closing the openings through the end bulk heads of the sections, to render each section seaworthy when the sections are separated. Another object of the invention is to arrange for pipes in the water bottom connecting compartments thereof fore and aft of the bulk heads when the sections are together, but readily removable, there being means for effectively closing the corresponding holes through the abutting bulk heads when the sections are disconnected. Other more detailed objects of the invention will appear from the description hereinafter given.

With my invention sections may be built and launched separately, and in such form taken to and conveyed through canals, for example, or the vessel may be formed complete and launched as a single unit and as such proceed under its own power to the canal and there disconnected while afloat. The connection, after the sections have passed through the canal, may be permanent including the welding of plates and riveting, or the sections may remain simply bolted together, whereby the separation and the joining may be effected repeatedly without requiring dry docking. This latter feature may be valuably employed in vessels navigating alternately on the Great Lakes and the ocean. My invention is further valuable in allowing one or more sections of the vessel to be salvaged in case of a wreck affecting only the other section, or sections.

In carrying out my invention I provide a vessel in two or more sections, each with an athwartship bulk head forming a vertical end wall, smooth on the outer side. This bulk head on its inner side is connected with the decks and is properly braced so that the vessel may be navigated with this bulk head as an end closure. When the sections are launched separately and intended for connection at some distant point, they should be ballasted and trimmed to float approximately on an even keel, so that when they are brought together the end bulk heads closely abut and the joining may be made with the least cost and effort. When the sections are abutted and brought into registration by means hereinafter described they are tightly secured together by bolts or rivets which are placed in registering openings already prepared for them. After the bolts above the water line have been fitted and tightly set up if the lower portions of the bulk head do not abut, the trim of the vessel may be altered to cause such abutting.

When the sections are separated the bolt holes are closed by suitable water tight closures hereinafter explained. In joining the sections these closures are removed one at a time and the bolts put in place. In performing this operation I prefer to fit the bolts across the top or upper deck angles first, then equally down each side in the boundary angles to the center keelson. When making or releasing the joint a heavy canvas jacket of suitable width with small steel wire cables or ropes attached to the edge and carrying wire spreaders may be reeved under the hull of the vessel and drawn up tight against it to prevent seepage.

The water pipes in the water bottom which normally pass through the transverse bulk head are removed at such point before separation of the sections and suitable plugs or closures substituted.

Describing the operation of bringing the sections into accurate registration ready for bolting together, after these sections have passed through a lock or canal, for instance, their bulk-headed ends are caused to abut while they are afloat and the two sections are brought into as near approximate registration as may conveniently be done. I then draw these sections into accurate registration by extending through the abutting bulk heads long bolts which are arranged to have a ball and socket seating in pads carried on the inner sides of the bulk heads. These pads have flaring openings of sufficient size to allow the bolts to pass through quite diagonally in any direction and have at their extreme inner faces spherical seats. Collars on the bolts (at least one of which is slidable) have spherical faces and are adapted to seat against these pads. When such bolts and collars are in place nuts turned on the end of the bolts draw the sections into accurate registration and tightly together. The construction just described may be left permanently in the connected vessel or, if desired, the bolts with their collars may be removed after the parts are joined.

My invention includes the method of joining the vessels above outlined and includes the vessels having the construction adapted for this purpose. These characteristics are hereinafter more fully explained in connection with the drawings which show a vessel embodying and illustrating my invention.

Figure 20:
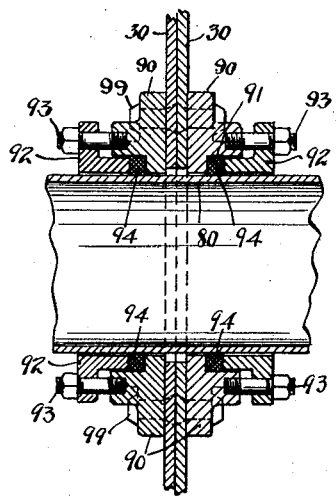
Figure 21:
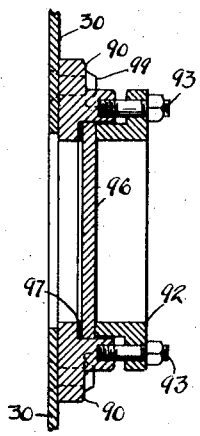
Figure 22:
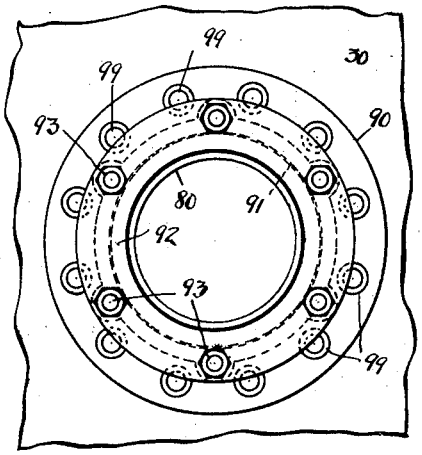
Figure 23:
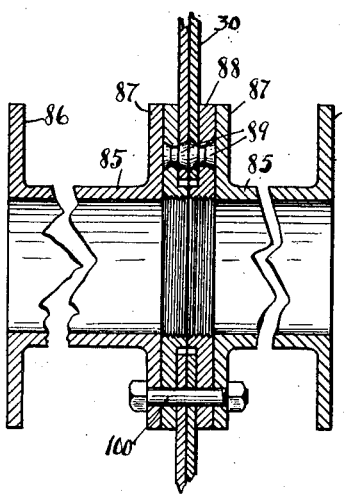
Figure 24:
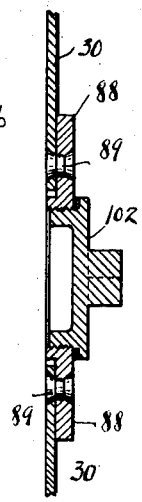
Figure 25:
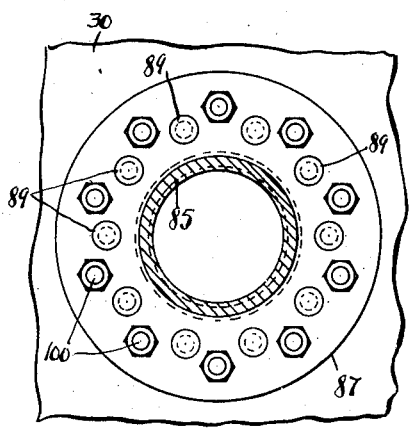

Figure 1 is an athwartship vertical section of half of the vessel adjacent to the bulk head and looking toward the bulk head; Fig. 2 is a horizontal section of a portion of the ship adjacent to the shell when the sections are abutted, this view being taken just above one of the stringers as indicated by the line 2—2 on Fig. 1; Fig. 3 is a vertical fore and aft section of the part of the vessel shown in Fig. 2, being an inboard elevation of the stiffening brackets for the stringers and deck; Fig. 4 is a detail through one of the stringers, being an athwartship section, as indicated by the line 4—4 on Fig. 2; Fig. 5 is a fragmentary elevation showing the inner face of the bulk head and one of the vertical stiffeners; Fig. 6 is a detail in cross section through a vertical stiffener, as indicated by the line 6—6 on Fig. 5; Fig. 7 is a detail of the fastening at the tank top, being a cross section in a plane parallel with Fig. 1; Fig. 8 is a horizontal section just above the angle secured to the tank top; Fig. 9 is a fragmentary horizontal section just above the tank top; Fig. 10 is a fragmentary plan showing the gunwale angle and through bosom strap employed. Fig. 11 is an enlarged detail in athwartship section adjacent to the gunwale; Fig. 12 is an enlarged detail in fore and aft section through the shell of the vessel and the boundary angle showing one of the bolt holes in the bulk head; Fig. 13 is a plan of a jacket which may be employed to prevent seepage during the joining or releasing of the sections; Figs. 14, 15 and 16 are in the nature of diagrams illustrating the joining of the sections, Fig. 14 being a side elevation of the vessel partly broken away, Fig. 15 a plan with the sections abutting but out of registration, and Fig. 16 a fragmentary plan illustrating the sections brought into registration; Fig. 17 is a horizontal section through corresponding pads of the two sections when the sections abut but are out of registration, being in the position shown in Fig. 15; Fig. 18 is a horizontal section of the same parts when the sections have been brought into registration and are ready for bolting together; Fig. 19 is a horizontal section through one of the pads when the sections are disconnected and the pad hole closed; Fig. 20 is an enlarged fore and aft section through the axis of a pipe in the water bottom extending through the bulk heads, this view representing the construction where a wrought-iron pipe is employed; Fig. 21 is a view of one of the members of the water pipe connection of Fig. 20 when the pipe is removed and a closure plate employed closing the opening and the sections are separated; Fig. 22 is an end view of the water pipe construction shown in Fig. 20; Fig. 23 is an axial section of a pipe connection through the bulk head, where cast iron pipes are employed; Fig. 24 is a view of this construction when the pipe is removed, the opening plugged and the vessel sections separated; Fig. 25 is an end elevation of the construction shown in Fig. 23.

As shown in Fig. 1, the hull of the vessel consists of the usual strakes 10 and doublers 11, individually butted, and vertical ribs or frames 12 leading from the center keelson 13 across the bottom, around the bilge and upwardly along the sides to the spar deck. These ribs may be of any suitable section; as shown they are for the most part in the form of channel sections (see Fig. 2), but adjacent to the main bulkheads they are angle members 15. The spar deck designated 16 in Fig. 1, is composed of suitable horizontal plates and athwartship angle beams 17. This figure shows also two intermediate decks composed of plates 18 and 20 and athwartship angle members 19 and 21, respectively. The water bottom providing the ballast is located between the bottom of the shell and the tank top 25, which is composed of plates approximately horizontal and athwartship angle members 26 shown as surmounting the plates and near the ends inclining downwardly as at 27 to the ribs 12 and fore and aft angles 28.

The transverse bulk head forming the end of each section consists preferably of vertical plates 30 extending from the bottom to the spar deck and abutting at their vertical edges. These plates are riveted to the horizontal flanges of the various athwartship deck angles, while at their vertical butting edges they are tied by the flanges of vertical angle members 32 extending between decks and riveted to the edge portions of adjacent plates.

The decks and bulk head plates are braced by triangular braces 33 which are riveted to the fore and aft flanges of the stiffeners 32 and have horizontal flanges 34 riveted to the upper or under side of the decks as the case may be. Riveted angle bars 35 complete the securing of these braces to the decks. The brace plates are stiffened at their diagonal edges by flanges 36.

It will be seen from Fig. 1 that vertical stiffeners 32 are provided not only at the abutting edges of adjacent bulk head plates but also at the vertical center of these plates. Between the shell bottom and the tank top the structure is braced and the bulk head plates are stiffened by construction similar to that above the tank top. Intermediately I provide girders extending in a fore and aft direction and effectively bracing the entire bottom structure. These girders are composed of vertical webs 37 and fore and aft angles 38 at the upper and lower edges thereof riveted to the webs and to the shell bottom and tank top respectively. Angle bars 39 are riveted to the ends of the girder plates and to the bulk head.

Intermediate of the decks are stringers 40 bracing the shell and bulk heads and composed of horizontal plates and suitable braces, shown particularly in Figs. 2, 3 and 4. Adjacent to the bulk heads the plates 40 are provided with doublers 42 and with angles 43 at the inner edge. The stringers are braced by athwartship bracing brackets 44 and riveted to the frames and at their upper edges flanged and riveted to the shelf. Fore and aft angles 148 run along the top of the stringer and against the inner edge of the ribs and are riveted to these members. The ends of the stringers are connected to the bulk heads by horizontal angle bars 41. Stringers are also connected with the bulk heads by vertical bracing plates 49, triangular in form, which are riveted to the angles 43 at the inner edge of the stringers and to the vertical stiffening angles 32 on the bulk heads. At the decks vertical plates 48, similarly connected, further brace the bulk heads. This bracing construction is shown particularly in Fig. 3.

The stringer is gradually narrowed as one proceeds away from the bulk head, the doubler being omitted where the stress does not require it. The narrowing portion of the stringer preferably has a flanged edge as shown at 45. When the stringer is reduced to its minimum width it preferably continues to the ends of the vessel. The stringer has suitable intercostal portions 46 projecting between the ribs and secured by flanges and angles 47 riveted to the shell.

The above construction will be varied with different types of vessels. The object is to provide a transverse end bulk head with a smooth faying surface and thoroughly braced on the inner side.

To provide for effectively securing together two abutting sections of the character described, I make holes through the boundary angles 15 and through the deck angles as 17, 19, 21, 26, and if desired through the stiffeners 32, through which bolts or rivets may be passed for effectively securing the two sections together. The holes are accurately reamed to enable perfect registration when the two bulk heads are abutted, and the circuit of bolts extending across the top and bottom and down the sides of the vessel, together with the intermediate bolts, fit their holes tightly and securely hold the two sections together.

At the spar deck, I provide a gunwale angle which rests on the deck stringer and at its outer edge abuts the sheer strake. The deck plates have an edge abutment with the stringer, and the doublers on these plates abut the inner edge of the gunwale angle. An angular bosom strap surmounts the gunwale angle, and bolts pass through its flanges the gunwale angle and the stringer and sheer strake respectively and connect these various parts together. This bosom strap is a through member overlapping the two sections and put in place after the sections are brought together.

To draw the vessel sections together, without requiring accurate previous registration of them, as well as to hold them in proper abutting registration during bolting, or thereafter permanently, if desired, I provide the following construction.

At the inner face of each end bulk head is a pad 50 which is shown as a casting made of web construction for lightness and having edge flanges 51 abutting the angles 32. These edge flanges are riveted or bolted to these angles. The pads have flaring or conical cavities 53 and at the inner face of these is a partially spherical seat 54. I provide long bolts 60 adapted to occupy the cavities of pads on two abutting sections, if approximately registering. These bolts are surrounded by partially spherical collars 52 which rest against the seats 54. The head 63 of the bolt bears against one of these collars and a nut 64 screwing onto the bolt against the other collar.

When the two sections designated A and B, in Figs. 14–16, are abutted together while afloat they may take the off set position shown in Fig 15. Then if a bolt 60 be passed through the corresponding pads of the two sections, it will have the diagonal position illustrated in Figs. 15 and 17. Now the tightening of a nut 64 on this bolt draws the two sections of the vessel into accurate registration, the final position of the both sections being illustrated in Fig. 16, and a larger view of the registering pads in Fig. 18.

The primary purpose of the construction just described is to bring the two sections together in proper registration for their joining. After being joined the bolts and spherical collars may be removed or left in place as desired. When the sections have been drawn together bolt holes through the boundary and deck angles of the two sections are in registration. It is then only necessary to remove temporary stoppers for these holes and pass bolts through them and screw up the nuts thereon to effectively connect the two sections together.

To enable the bolt 60 to be readily put in position through the corresponding pads of the two bulk heads I prefer to tap a recess 66 in the end of the bolt. A light gas pipe 68 may be readily passed through the openings of the coöperating pads and screwed into the end of the bolt and serve to draw it into place in the two pads.

After the sections are firmly bolted together a heavy angular bosom strap 76 is placed over the end portions of the gunwale angle 77, extending a sufficient distance each side of the junction line to allow a number of bolts 78 to be passed through the bosom strap, gunwale angle and deck stringer, as illustrated in Figs. 10 and 11. The upright flange of this bosom strap is also firmly bolted by bolts 79 to the sheer strake and sheer doubler. If desired to further reinforce the junction, to reduce the amount of fastening through the bulk heads, the outside doublers for the deck or shell, or both, may be through plates added after the sections are bolted together, and properly secured by bolts countersunk in the doubler and having nuts on the inner side of the vessel, or by rivets, as may be desired.

The stoppers for the bolt holes may conveniently be of the form shown in Fig. 12 and consist of plugs 70 screwing into the bolt holes in the boundary angles 15 and various other angles. The outer portion of the bolt holes is threaded for this purpose as shown at 71. The plugs have angular heads whereby they may be readily turned and have overhanging flanges 72 and are adapted to clamp gaskets 73 against the inner face of the angle flange.

In securing the sections together after they have been brought into accurate registration by the positioning and tightening of the bolts 60, I remove the plugs 70, one at a time, from each bulk head and replace them by fore and aft bolts, the nuts of which are immediately screwed on and tightened. This replacement starts preferably at the center of the spar deck and works outwardly to the gunwale, then downwardly along the sides of the vessel and inwardly across the bilge and bottom to the keelson.

The plugs referred to close the bolt hole openings when the sections of the vessel are separated. To close the openings in the pads 50 I provide plates 58 which may be tightly bolted across the face of the pads upon an interposed gasket 59, see Fig. 19. These provisions close the corresponding openings, providing for the seaworthiness of the vessel sections when separated.

There are preferably two of the pads 50 for each bulk head located between the upper two decks and comparatively near the stringers, though the number and position of these may be altered as desired.

It is usually desirable in vessels having water bottoms to provide fore and aft pipes for pumping the water in or out of the different compartments. Such a pipe is illustrated at 80 in Fig. 1. It is located between the bottom plates and the tank top and adjacent girders. Where the pipe passes through the transverse bulk heads, I provide means for disconnection, and the closing of the openings when the sections are separated. Such means are illustrated in Figs. 20 and 25 inclusive. The first three of these figures show the construction for wrought iron pipes, such as used on the Great Lakes, and the latter three figures for cast iron pipes, which are usually employed in ocean navigation.

Referring to the wrought iron construction of Figs. 20–22, it will be seen that a flange 90 is riveted (by rivets 99) to the bulk head plates 30. This flange has an annular recess 91 into which extends the sleeve of a gland member 92, held to the flange by bolts 93 and compressing a packing 94 against the base of the recess and the side of the pipe. The removal of the gland member enables the pipe 80, which has been uncoupled at its ends, to be slid out of the flanges. When the pipe is removed the opening is closed by a plate 96 seating in the stuffing box recess against a gasket 97 and clamped to the gland ring 92.

When the cast iron pipes are employed, I prefer to use short sections 85, Fig. 23, adjacent the bulk heads, the flanges 86 of which are normally bolted to the flanges of the stationary continuing pipes while the flanges 87 adjacent the bulk heads seat against smooth rings 88 secured by rivets 89 to these bulk heads, and are secured in place by through bolts 100. When the sections are to be separated the pipe sections 85 are unbolted at each end and removed and threaded plugs or caps 102 are screwed into place in the rings 88, closing the openings.

It will be seen from the construction described that all openings through the end bulk heads are simply and effectively closed providing a safe end for the vessel section. The sections may accordingly be towed to the place of joining and then abutted and brought into registration and bolted together. Abutting and rough positioning of the sections may be very readily accomplished while the vessels are afloat by the usual towing means. When approximately abutted the drawing bolts 60 may be put in place and the sections pulled into accurate registration by the tightening of the nuts 64. When in such accurate registration, as heretofore stated, the plugs 70 are removed one after the other and replaced by bolts, or rivets may be used if desired.

The placing of all of the bolts above the water line will naturally hold the sections very closely together, and due to their smooth faying surfaces very little water can pass between them. To prevent seepage however while bolts are being placed below the water line, I may extend around the junction a canvas jacket. Such jacket is illustrated in Fig. 13 and comprises a sheet of heavy canvas 105, wire cables 106, bounding the edge of it, and transverse wire ropes 107 bracing it transversely. Such a jacket is sunk under the bow of the vessel and passed aft until it is beneath the line of junction and then drawn up tight against the bottom and sides of the hull, by pulling upwardly on the cables 106 which may be connected with ropes depending from the deck.

When this canvas jacket is drawn against the hull the water pressure will maintain it tight and prevent seepage during the operation of removing the lower plugs and inserting the bolts. After the sections are together, the closures for the water bottom pipes are removed and the pipes put in position and tightly held in place.

In separating the vessel into its sections the reverse operation from that described is effected. That is to say the canvas jacket is preferably put in place, the water pipes removed and the closures put in place, then the bolts removed beginning at the bottom and their holes closed by plugs beginning at the center keelson and working outwardly along the bilge and upwardly along the sides and thence across the spar deck angle. After the bolts are removed to a point above the water line, the canvas jacket is removed and all the bolts are removed. It is assumed that during this operation the through bolts 60 will be maintained tightly in place to hold the sections during the time the last few bolts are being removed. After these bolts have all been removed, the nuts 64 are loosened and the two sections of the ship swing into whatever position their flotation gives them.

In case the bolts 60 and their collars were removed after the previous joining of the vessel they are replaced preferably before the removal of the bolts begins. After the removal of the water pipes and the various connecting bolts or rivets and the long bolts 60 and the closing of the openings occupied by these members, the sections are in condition for separate navigation.

In addition to the above description of the construction and operation of the parts shown in the drawings, mention may be made of the following points which should be observed, namely: the rivets of the angles to the bulk heads are countersunk in the bulk heads so that their outer ends are perfectly flush with the faying surfaces of the bulk heads. These bulk heads are smooth and may be coated with red lead before bolting together. The bolt holes are punched smaller than required for the finished bolt and then reamed out true to the specified diameter to form a tight fit. Any doorways or other openings in the bulk head are provided with means for tightly closing them with plates and gaskets bolted in place, as will well be understood; also openings for extinguisher pipes, etc., may be provided for, as in the case of the ballast pipes.

When it is intended to substitute larger through bolts or rivets or both in place of rivets which, when the parts are separated, secure the bulk head plates to their angles, the heads of the rivets should be of such size that there larger ends are no larger than the diameter of the bolts, so that the openings for these temporary rivets may be readily reamed out to eliminate the countersinking feature and provide the proper cylindrical openings for the bolts. The spacing of the temporary rivets is therefore adjusted to meet the requirements of such large size bolts or rivets as may be employed when the bulk heads are joined.

If the sections after being brought together at their proper place, after passing through a canal, for instance, are intended to be permanently secured together rivets or bolts or both may be employed. When permanent through rivets are so employed I prefer to use service bolts in every other hole tightly securing the sections together until the rivets are properly placed and upset. Then such service bolts may be replaced by through rivets. For this permanent construction it is also practicable to weld the abutting edges of the strakes of the shell and decks above the water line, electrically, or by any approved process, as desired. The vessels, however, may be constructed, as above explained, so that they may have the required strength without such welding. The construction of the bulk heads and bolting described gives a strength at the center which is in excess of that at other points.

When it is intended to build the sections apart and launch the same separately, the bulk head or end of the section that goes to form the joint should be assembled and riveted, and the two bulk heads placed together, and the work of reaming out and fitting the bolts carried out while the two are in registration. The joint may then be released and the two parts set up on the building berth comparatively short distance apart. This distance, selected according to the launching and other conditions, should be precise and equal at all points between the two surfaces of the bulk heads, which may be conveniently spaced and held rigidly parallel by fitting rods between the two sections with two nuts at each end of each rod.

If desired manholes indicated at 110 may be cut through the tank top between the longitudinal girders to allow access to the tank, and such manholes should preferably have their greater diameter fore and aft. These manholes are on either side of the joint as illustrated in Fig. 8. They may be availed of in trimming the vessel for joining, a plate and a flange for piping being fitted to the manhole and enabling the water to be forced into a compartment or drawn from it as flotation conditions require.

The seams of the outside strakes of the shell and decks may be calked before the outside doublers are fitted, and the spaces between the same may be welded to provide a good water tight job. All of the strakes of the shell plating should be augmented or reinforced with suitable doubler plates, of a thickness and length to meet the requirements of the size and type of the vessel in hand, and arranged to admit of the close spacing with large diameter rivets in the shell flange of the transverse frame or boundary angles, and also to stiffen the shell in the way of intercostal stringer connections. The side stringers may be increased in number or augmented with partially short stringers or brackets, as the size or type of the vessel may call for, and various intercostal reinforcements may be made, the object here being to provide a stiff and strong side construction.

As heretofore explained my bulk heads are designed to form a permanent part of the vessel in contra-distinction to temporary bulk heads such as have been heretofore inserted when vessels are temporarily severed. By making these bulk heads permanent I can secure them much more firmly and can avail myself of them for transverse stiffening when the vessel is connected. These bulk heads and the through bolts or rivets connecting them provide through connections, the area of which is in excess of the cross section of the vessel at other points so that there is no danger of the vessel breaking apart at the connection. The boundary angle 15 is secured in a very firm manner to the shell by having an extra-wide flange against the shell and riveted to it by a plurality of rows of large diameter rivets. Fig. 12 shows three rows of rivets for this purpose. The rivets in the adjacent rows are staggered.

My invention may be availed of in the separation of existing vessels—that is to say such vessels may be cut in two and end bulk heads applied to the two sections and braced substantially as already described. These bulk heads can be left permanently in the vessel after its joining. In vessels which already have bulk heads sufficient to provide for their flotation when cut in two, I may dispense with the entire portion of my end bulk head using only the portion adjacent to the shell or what may be called wings. These wings are suitably braced and have boundary angles connecting them with the shell, these angles having holes for the passage of connecting bolts. The pads 50 in this case will be secured to these wings. This construction would provide for instances where there is already a bulk head across the hold or water bottom or both, or if there is a bulk head between decks but not across the entire vessel, I may employ my end bulk head in partial form.

It will be seen, therefore, that my bulk head construction and means of connecting of the vessel sections covers all the conditions which may obtain, namely, a complete bulk head from keel to upper deck and side to side of the vessel; an open hold in an open water bottom; an open hold in a closed water bottom; a closed hold in an open water bottom; a closed water bottom and a partial bulk head at any point above the water bottom; an open water bottom and a partial bulk head at any point above it. Any of the above combinations may have fore and aft bulk heads located as desired.

It is to be understood that the drawings show simply one form of vessel embodying and illustrating my invention, and that the particular arrangement of plates, girders, angles, etc., will vary with different types of vessels. I do not intend to limit myself to the construction shown, further than the appended claims and the prior art may require.

Having thus described my invention what I claim is:—

1. The method of constructing vessels consisting of building the vessels in sections each terminating in an athwartship bulk head forming a permanent part of the vessel, said bulk heads having holes through them adapted to register, closing said holes below the water line by closures removable from the inside of the hull, bringing the sections together while afloat with their bulk heads abutting, and successively removing the closures and substituting through connecting devices occupying both bulk heads.

2. The method of constructing vessels consisting of building them in sections each terminating in an athwartship member connected with the shell and forming a permanent part of the vessel, transporting the sections to the desired place for joining them, then abutting the sections in rough registration, then drawing them into accurate registration by tension devices connecting the two sections, and then placing through bolts or rivets in registering holes through said members of the two sections.

3. The method of constructing vessels consisting of building them in sections each terminating in athwartship bulk heads, forming a permanent part of the vessel, each bulk head having a row of holes through it adjacent to its boundary, closing such holes below the water line on the inner side of the vessel, thereafter transporting the sections to the desired place for joining them, then abutting the sections in rough registration, then drawing them into accurate registration by means connecting the two sections, then successively removing the closures for the said holes and placing through bolts or rivets in the registering holes of the two sections beginning at the top and proceeding successively to the bottom.

4. The method of constructing vessels, consisting of making a vessel in sections, each terminating in a transverse member forming a permanent part of the vessel and having a smooth flat faying surface, said members being made of metal connected with the decks and braced on their inner sides by structural members, each member having a reinforcing flange at its edge connected with the shell of the vessel and there being holes through said flange, thereafter transporting the sections to the place of joining, abutting them while afloat into approximate registration, pulling the two sections laterally and longitudinally together into accurate registration, removing the closures for the openings and placing through bolts or rivets in such openings.

5. The method of constructing vessels consisting of building them in sections, each section having at its end a transverse bulk head forming a permanent part of the vessel and smooth on its exterior, said bulk heads being provided with registering openings temporarily closed by means removable within the vessel, thereafter independently floating the sections into abutting engagement of their bulk heads and bringing them into registration, locating a flexible jacket beneath the vessel across the line of junction with its ends extending above the water line, removing the closures below the water line, and replacing them by bolts or rivets extending through the bulk heads.

6. The method of constructing vessels consisting of making them in sections, each section having an end bulk head with a row of openings through it adjacent to the shell and each section having decks and upright stiffeners connected with the decks and bulk heads, there being a pipe opening through the bulk head between the hull and the tank top and located laterally between upright stiffeners, and there being removable members for closing the bolt openings and the pipe opening below the water line, transporting the sections so equipped independently through a restricted passage, then, while they are afloat, bringing their bulk headed ends together and pulling them into accurate registration, bolting the bulk heads together above the water line, removing the closures below the water line and substituting bolts or rivets through the bolt holes at these points, removing the closure for the pipe opening, and placing a pipe in registration with the latter opening.

7. In a sectional ship, the combination of a plurality of sections having at one end an externally smooth transverse member forming a permanent part of the ship, openings through such transverse members in registration in two sections of the ship, securing devices adapted to pass through said openings, and removable means for temporarily closing the openings at least below the water line.

8. In a sectional ship, the combination of a plurality of sections having at one end an externally smooth transverse member forming a permanent part of the ship, openings through such members in registration in two sections of the ship, securing devices adapted to pass through said openings, and removable plugs having lateral flanges and angular heads and a screw threaded portion adapted to screw into openings, and a gasket adapted to surround the plug and be compressed by its screw.

9. In a sectional ship, the combination of a plurality of bulk headed sections having transverse members at the ends of the sections, mechanism carried by said members for drawing the sections together into accurate registration, and means for securing the sections together.

10. In a sectional ship, the combination of two bulk headed sections each terminating in transverse members connected with the shell, laterally shiftable tension devices adapted to extend through said members of sections which are in approximate registration and bring them into accurate registration, and means adapted to extend through said members for securing the sections when in such accurate registration.

11. In a sectional ship, the combination of two sections each provided with an end bulk head, and a connecting device for drawing the two sections together, said device being adapted to extend through enlarged openings in the bulk heads and having a ball and socket seating in the inner side of each bulk head.

12. The combination, with two ship sections, each provided with a transverse member, pads on the inner sides of said members having seats, a bolt adapted to extend through openings in the pads, and collars on the bolt having a curved surface engaging the pads.

13. The combination with two ship sections having end bulk heads and openings through them, pads on the inner sides of the bulk heads having openings registering with the bulk head openings, spherically formed seats on the pads, a bolt adapted to extend through the pads and bulk heads, and swing laterally in the openings thereof, spherically formed collars on the bolt at least one of which is movable, and means for forcing one of said collars along the bolt.

14. The combination with ship sections each having a transverse end member with an opening through it, pads on the inner sides of said members opposite the openings, said pads having openings in registration with the openings of the end members and converging to a spherical seat, a bolt adapted to extend through the pads and bulk heads and having spherically formed collars in it at least one of which is movable longitudinally of the bolt, and a nut screwing onto the bolt beyond such movable collar.

15. The combination with ship sections terminating in end bulk heads, pads on the inner sides of the bulk heads having conical passageways flaring toward the bulk head, an opening through the bulk head registering with the large end of the said passageway, seats on the other face of the pads around the smaller end of the conical passageway, a bolt adapted to pass through said pads and swing in all directions therein and collars on the bolt adapted to bear against the seats, and means for forcing one of the collars lengthwise of the bolt.

16. The combination of ship sections terminating in end bulk heads, each bulk head having stiffeners parallel with each other, a box-like pad on each bulk head located between the stiffeners and secured to adjacent stiffeners, said pad having a passageway in it flaring toward the bulk head, there being an opening through the bulk head plate registering with the large end of the passageway and the other side of the pad being formed into a spherical seat, a bolt adapted to extend through the pads, collars on the bolt having spherical seats adapted to engage the seats on the pads, at least one of said collars being longitudinally shiftable, and a nut screwing onto the bolt and adapted to bear against such shiftable collar.

17. The combination with ship sections each terminating in and end bulk head, pads on the inner sides of the bulk heads having flaring passageways registering with openings through the bulk heads, a bolt adapted to extend through the pads and provided with collars to bear against the inner face of the pads, means for moving one of said collars along the bolt, the extreme end of the bolt having a hole tapped into it, whereby means may be screwed into it for guiding the bolt through the pads.

18. The combination with ship sections each terminating in an end bulk head, pads on the inner sides of the bulk head having flaring passageways registering with openings through the bulk heads, a removable bolt adapted to extend through the pads and provided with collars to bear against the inner face of the pads, means for moving one of said collars along the bolt, a removable plate adapted to close the inner end of the opening, and means for securing said plate in a watertight manner to the inner face of the pad when the bolt and collar are removed.

19. The combination with a plurality of ship sections, each having a transverse bulk head end member and each having a water bottom covered by a tank top, said bulk heads having registering openings leading into the respective water bottoms, and means for removably securing a pipe to the end bulk head at each opening.

20. The combination with two ship sections, each having an end bulk head provided with an opening therethrough, said openings being adapted to register when the ship sections are brought together, and means for removably securing pipe ends to the bulk heads at such openings in a water tight manner.

In testimony whereof, I hereunto affix my signature.

JAMES NACEY.